United States Patent
McCoy et al.

(10) Patent No.: US 7,403,373 B2
(45) Date of Patent: Jul. 22, 2008

(54) SYSTEM AND METHOD FOR MOUNTING A BREAKER

(75) Inventors: Brian Timothy McCoy, Duluth, GA (US); Thomas William Holland, Flowery Branch, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/328,709

(22) Filed: Jan. 10, 2006

(65) Prior Publication Data

US 2007/0159776 A1    Jul. 12, 2007

(51) Int. Cl.
  *H02B 1/04* (2006.01)
  *H02B 1/20* (2006.01)
  *H01H 9/00* (2006.01)
  *A47B 96/00* (2006.01)

(52) U.S. Cl. .................. 361/673; 361/634; 361/652; 361/601; 200/294; 248/222.11

(58) Field of Classification Search ............. 361/600, 361/627, 673, 807, 601, 634, 652; 335/42, 335/202; 439/716; 403/13; 200/50.01, 50.21, 200/294; 248/222.11
  See application file for complete search history.

(56) References Cited

U.S. PATENT DOCUMENTS

| | | | | |
|---|---|---|---|---|
| 3,249,991 A * | 5/1966 | Leonard | ............ | 29/709 |
| 3,398,249 A * | 8/1968 | Dessert | ............ | 200/294 |
| 4,018,413 A * | 4/1977 | Bauer | ............ | 248/214 |
| 4,181,924 A * | 1/1980 | Thomas et al. | ............ | 361/634 |
| 4,351,620 A * | 9/1982 | Stritt et al. | ............ | 403/13 |
| 4,435,739 A * | 3/1984 | Shelvik | ............ | 361/627 |
| 4,672,508 A | 6/1987 | Bridges | | |
| 4,744,003 A | 5/1988 | Koslosky | | |
| 4,868,529 A * | 9/1989 | Holland | ............ | 335/42 |
| 4,878,859 A * | 11/1989 | Haller et al. | ............ | 439/716 |
| 5,334,808 A * | 8/1994 | Bur et al. | ............ | 200/50.21 |
| 5,392,196 A * | 2/1995 | Kinner | ............ | 361/809 |
| 5,486,979 A * | 1/1996 | Bowen et al. | ............ | 361/640 |
| 5,694,288 A * | 12/1997 | Shortt et al. | ............ | 361/673 |
| 5,744,768 A * | 4/1998 | Bishop et al. | ............ | 200/50.01 |
| 5,761,026 A | 6/1998 | Robinson | | |
| 5,768,091 A * | 6/1998 | Vinson et al. | ............ | 361/601 |
| 5,875,093 A * | 2/1999 | White | ............ | 361/637 |
| 5,880,927 A * | 3/1999 | Kent et al. | ............ | 361/634 |
| 5,943,207 A | 8/1999 | Kim | | |
| 6,052,047 A * | 4/2000 | Malingowski et al. | ...... | 335/202 |
| 6,062,914 A * | 5/2000 | Fasano | ............ | 439/716 |
| 6,292,076 B1 * | 9/2001 | DeGrazia et al. | ............ | 335/202 |
| 6,680,842 B1 * | 1/2004 | Pelaez et al. | ............ | 361/631 |
| 6,806,799 B2 * | 10/2004 | Runyan | ............ | 335/6 |
| 7,286,340 B2 * | 10/2007 | Karim et al. | ............ | 361/647 |

* cited by examiner

Primary Examiner—Jayprakash N Gandhi
Assistant Examiner—Bradley H Thomas

(57) ABSTRACT

Certain exemplary embodiments comprise a circuit breaker mounting plate that can comprise a prong adapted to receive a clip. The prong can define a first longitudinal axis that extends in a first direction and in an opposing second direction. The prong can be adapted to receive a spring. The clip can comprise a latch. The latch can be adapted, via the spring, to releasably attach a circuit breaker to the circuit breaker mounting plate.

21 Claims, 6 Drawing Sheets

SYSTEM AND METHOD FOR MOUNTING A BREAKER

BACKGROUND

U.S. Pat. No. 4,744,003 (Koslosky), which is incorporated by reference herein in its entirety, allegedly recites that "[p]lug-on enclosed fusible switches, enclosed lug devices and non-enclosed molded case circuit breakers are attached to a panelboard in a single or side-by-side double row. Spring biased latches retain the devices to the panelboard. Locating notches on the panelboard locate the devices at incremental spacing to provide a variable, compact arrangement for the devices. Filler plates and end structures on the devices cooperate with a cover for the panelboard to provide an integral dead front. The panelboard is particularly adapted for field [sic] assembly, including attachment of a main feed device which effects a plug-on feed in either a single or electrically parallel double panel arrangement." See Abstract.

U.S. Pat. No. 5,768,091 (Vinson), which is incorporated by reference herein in its entirety, allegedly recites a "circuit breaker mounting bracket is comprised of a generally upright support member, a base member extending generally perpendicularly from a bottom of the support member, a flange depending from a distal end of the base member at an angle less than 90 degrees, and a brace member depending obliquely from the back of the support member. The flange is adapted to be secured to a support surface, such as a deck within an air conditioning or furnace cabinet. The brace member and the flange cooperate to maintain the bracket in a rigid, upright position within the cabinet. The bracket includes a din rail comprising two generally L-shaped flanges integrally formed with the support member, whereby one or more circuit breakers are mountable in a fixed position relative to the bracket. A C-shaped channel is formed on the support member between the L-shaped flanges for receiving two retaining members, which inhibit lateral movement of the circuit breaker(s) mounted on the bracket." See Abstract.

U.S. Pat. No. 5,943,207 (Kim), which is incorporated by reference herein in its entirety, allegedly recites a "mountable circuit breaker assembly and a method for mounting a circuit breaker on a base. A body portion of the circuit breaker is provided with rail insertion grooves on opposite sides thereof. The rail insertion grooves receive stepped portions of a corresponding pair of mounting rails mounted on a base. The circuit breaker body is retained relative to the mounting rails by engaging a protruding portion provided on one of the stepped portion of the mounting rails and the rail insertion grooves with a recessed portion provided on the other of the stepped portion of the mounting rails and the rail insertion grooves. The circuit breaker may be mounted onto a base on which the pair of mounting rails is provided by sliding the circuit breaker body between the mounting rails so that the respective stepped portions of the mounting rails are received in the respective rail insertion grooves provided on the circuit breaker body." See Abstract.

SUMMARY

Certain exemplary embodiments comprise a circuit breaker mounting plate that can comprise a prong adapted to receive a clip. The prong can define a first longitudinal axis that extends in a first direction and in an opposing second direction. The prong can be adapted to receive a spring. The clip can comprise a latch. The latch can be adapted, via the spring, to releasably attach a circuit breaker to the circuit breaker mounting plate.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1A:
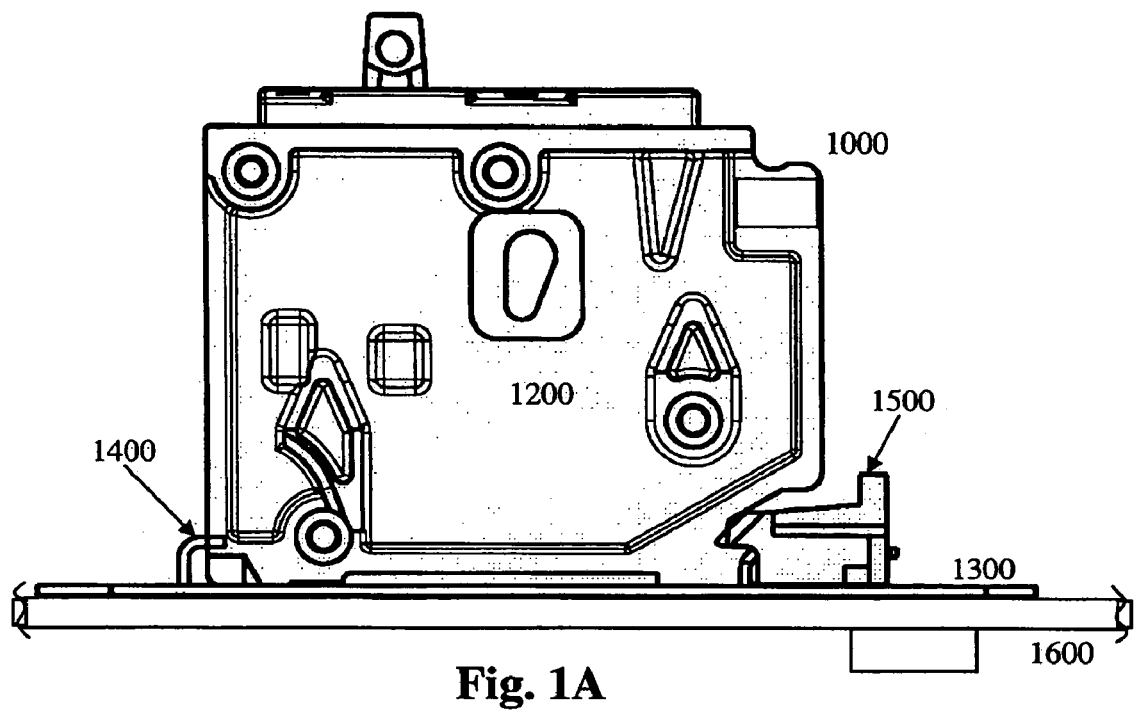
FIG. 1A is a side view of an exemplary embodiment of a system 1000.

When the following terms are used substantively herein, the accompanying definitions apply:

a—at least one.

activity—an action, act, step, and/or process or portion thereof.

adapted to—capable of performing a particular function.

adjacent—in close proximity.

and/or—either in conjunction with or in alternative to.

anterior—placed before or in front.

apparatus—an appliance or device for a particular purpose.

application—the work of applying something.

applying—to put to use for a purpose.

approximately—nearly the same as.

area—a surface with determinable boundaries.

bracket—a weight bearing and/or motion restraining structural component adapted to restrain a circuit breaker relative to a circuit breaker mounting plate.

can—is capable of, in at least some embodiments.

circuit breaker—automatic switch that stops the flow of electric current in an overloaded or otherwise stressed electric circuit.

closable—adapted to be closed.

closed—having boundaries, enclosed.

coupled—connected or linked by any known means, including mechanical, fluidic, acoustic, electrical, magnetic, optical, etc.

helical spring—a wound metallic coil adapted to be elastically compressed.

clip—a weight bearing and/or motion restraining structural component adapted to slideably mount on a prong.

component—a part of a system.

comprising—including but not limited to.

connect—to join or fasten together.

couple—to join, connect, and/or link together.

cylindrical—characterized by a substantially circular cross section.

define—to establish the outline, form, or structure of.

device—a machine, manufacture, and/or collection thereof.

direct communication—in physical contact with.

direction—a distance independent relationship between two points in space that specifies the position of either with respect to the other; the relationship by which the alignment or orientation of any position with respect to any other position is established.

electrical—pertaining to electricity.

circuit breaker mounting plate—a wafer or plate on which electrical components are placed.

electrically coupled—connected in a manner allowing a flow of electricity between components.

electrical device—a machine or component utilizing electrical power.

end—an extreme point.

engaged—to become meshed or interlocked.

external—relating to, existing on, and/or connected with the outside or an outer part.

fasten—to attach to something else and/or to hold something in place.

flange—a protruding rim, edge, rib, or collar.

force—a capacity to do work or cause physical change.

gripper—a lip, flange, or surface adapted to be held and/or moved by a user.

helical spring retainer—a protrusion adapted to restrain motion of a helical spring.

insertion—an act of putting one thing into another.

install—to connect or set in position and prepare for use.

latch—a catch for fastening a circuit breaker to a surface.

leaf spring—a spring comprising a flexible metallic strip.

length—a measurement of a greatest dimension of an object.

lip—a protruding edge.

longitudinal axis—a straight line defined parallel to an object's length and passing through a centroid of the object.

loosely—having sufficient clearance to allow motion with relatively little resistance in at least one direction.

manage—to direct or control.

may—is allowed and/or permitted to, in at least some embodiments.

method—a process, procedure, and/or collection of related activities for accomplishing something.

motion—changing position or place.

mount—to attach on and/or to something.

mounting plate—a planar rigid body adapted to receive one or more devices.

move—change position from one location to another.

obtain—to receive, calculate, determine, and/or compute.

opposing—opposite to and/or pointing or facing away from each other.

orient—to position a first object relative to a second object.

panel—a substantially rigid housing adapted to support one or more electrical components.

parallel—of, relating to, or designating two or more planes that do not intersect.

partially—to a degree.

perpendicular—intersecting at or forming substantially right angles.

plane—a surface containing all the straight lines that connect any two points on it.

planar—shaped as a substantially flat two-dimensional surface.

plurality—the state of being plural and/or more than one.

portion—part.

position—a manner in which a thing is positioned and/or placed.

predetermined—established in advance.

prevent—to keep an event from happening.

profile—a quantitative description of an object.

prong—a weight bearing and/or motion restraining structural component adapted to slideably receive a clip.

retainer—a projecting part adapted to at least partially restrain an object.

provide—to furnish and/or supply.

receive—accept something provided and/or given.

relative—in comparison with.

rest—to not move and/or be supported by.

restrain—to limit and/or restrict.

retainer—a device, frame, or groove that restrains or guides.

retract—to draw back or in.

rotational—about and/or around an axis.

secure—to fasten.

slideably—a smooth and/or continuous motion of one object relative to another.

springably—elastically movable from a first position to a second position.

substantially—to a great extent or degree.

support—to bear the weight of, especially from below.

surface—an outer boundary of an object or a material layer constituting or resembling such a boundary.

system—a collection of mechanisms, devices, data, and/or instructions, the collection designed to perform one or more specific functions.

threaded—comprising a helical or spiral ridge on a screw, nut, or bolt.

top—an uppermost point.

unretracted—extended, not drawn back or in.

user—any person, organization, process, device, program, protocol, and/or system that uses a device and/or service.

via—by way of and/or utilizing.

wires—insulated strands of an electrically conductive metal.

DETAILED DESCRIPTION

Certain exemplary embodiments provide a circuit breaker mounting plate that can comprise a prong adapted to receive a clip. The prong can define a first longitudinal axis that extends in a first direction and in an opposing second direction. The prong can be adapted to receive a spring. The clip can comprise a latch. The latch can be adapted, via the spring, to releasably attach a circuit breaker to the circuit breaker mounting plate.

Certain exemplary embodiments comprise a mounting system that can be adapted to releasably attach a circuit breaker to a circuit breaker mounting plate. The mounting system can comprise a bracket. The mounting system can comprise a spring loaded latch that can be adapted to slide out of a path of travel of the circuit breaker as the circuit breaker is rotated into a mounted position. The spring loaded latch can be adapted to releasably attach the circuit breaker to the circuit breaker mounting plate. The circuit breaker can be removed from the circuit breaker mounting plate, by utilizing a tool or by hand, by sliding the spring loaded latch away from the circuit breaker followed by rotating the circuit breaker off of the bracket.

Certain exemplary embodiments can comprise a system comprising a number of plastic/sliding latches, such as one latch per pole, and/or one spring per latch. Certain exemplary embodiments can be assembled by hand without any tools or rivets. The system can provide a circuit breaker mounting plate of sufficient width to accommodate all the poles. The circuit breaker mounting plate can comprise depressions adapted to receive individual circuit breakers, each circuit breaker having a width of, for example, one, two, three, or more poles.

FIG. 1A is a side view of an exemplary embodiment of a system 1000, which can comprise a circuit breaker 1200 and a circuit breaker mounting plate 1300. In certain exemplary embodiments, circuit breaker mounting plate 1300 can be supported by and/or comprised in a fixedly and/or releasably attached circuit breaker panel 1600. Circuit breaker mounting plate 1300 can be fabricated from a plastic material, Teflon, aluminum, stainless steel, and/or painted carbon steel, etc. System 1000 can comprise a bracket 1400, which can be fixedly or releasably attached to circuit breaker mounting plate 1300. Bracket 1400 can be fabricated from a plastic material, Teflon, aluminum, stainless steel, and/or painted carbon steel, etc. System 1000 can comprise a clip 1500. Clip 1500 can be adapted to releasably attach circuit breaker 1200 to circuit breaker mounting plate 1300. Bracket 1400 can be adapted to slideably couple to a first side of circuit breaker 1200. Clip 1500 can be adapted to be coupled to circuit breaker 1200 on a second side of the circuit breaker, the second side substantially opposing the first side.

In certain exemplary embodiments, bracket 1400 and clip 1500 can be adapted to releasably attach a reversible circuit breaker 1200. Thus, if circuit breaker 1200 is rotated 180 degrees, circuit breaker 1200 can be releasably attached to circuit breaker mounting plate 1300 via bracket 1400 and clip 1500.

Figure 1B:
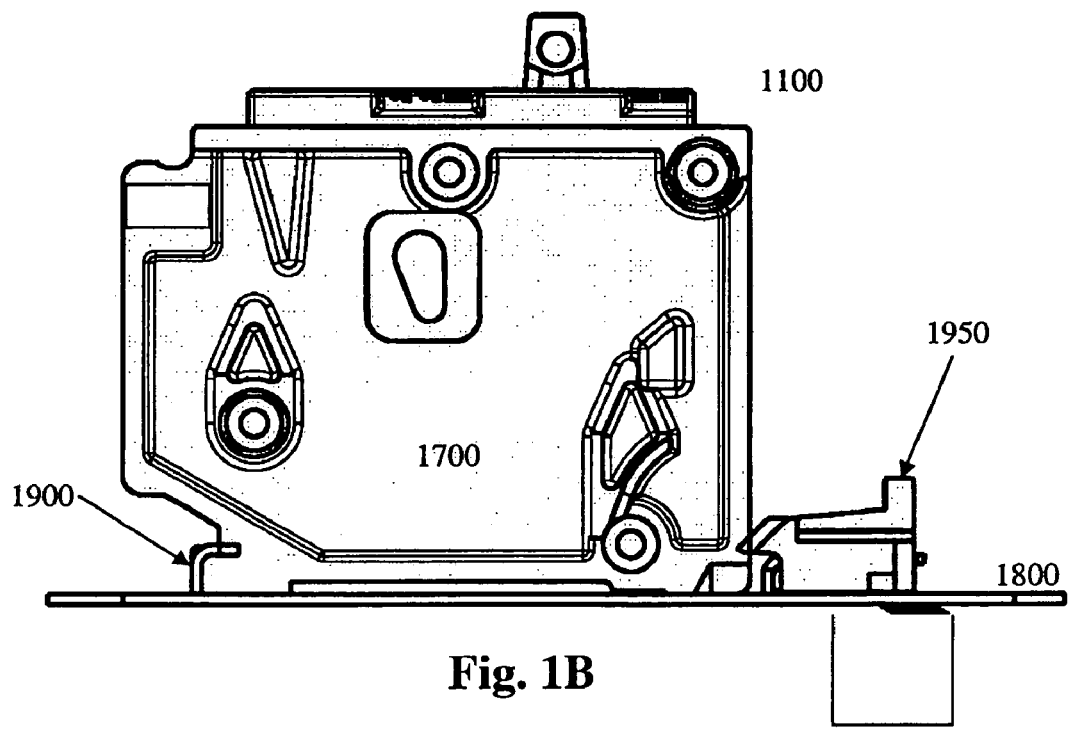
FIG. 1B is a side view of an exemplary embodiment of a system 1100.

FIG. 1B is a side view of an exemplary embodiment of a system 1100, which can comprise a circuit breaker 1700 and a circuit breaker mounting plate 1800. Reversibility can be visualized in system 1100 since circuit breaker 1700 can be identical to circuit breaker 1200, yet mounted in a reverse orientation relative to a bracket 1900 and a clip 1950.

Figure 2A:
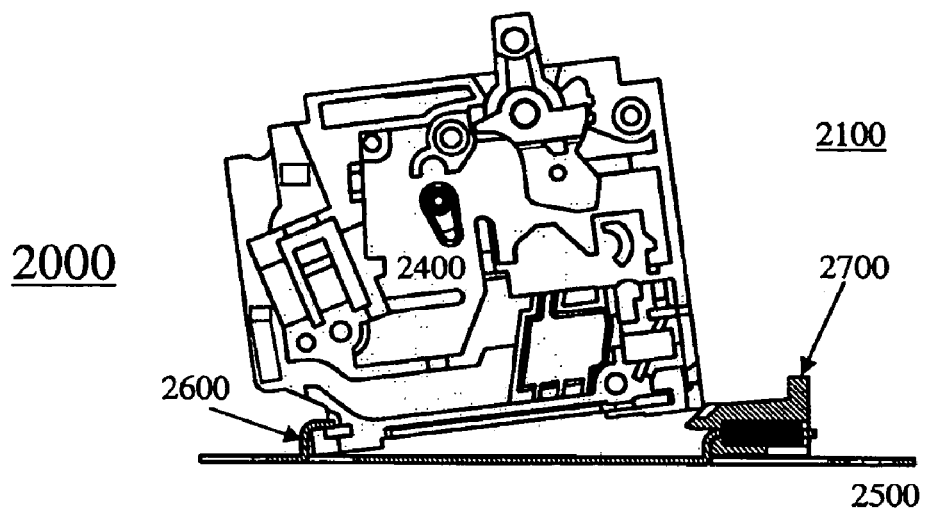
FIGS. 2A, 2B, and 2C are side views of an exemplary embodiment of a system 2000.
Figure 2B:
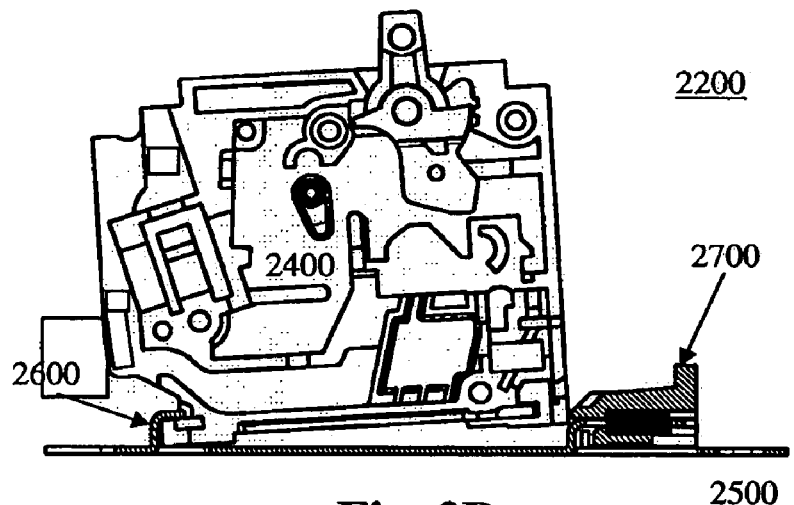
Figure 2C:
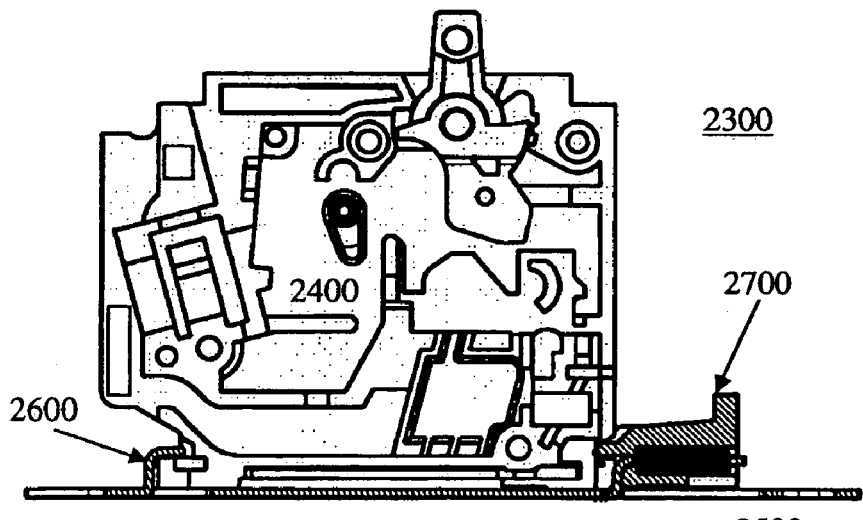

FIGS. 2A, 2B, and 2C are side views of a system 2000 showing a circuit breaker 2400 in each of several different positions with respect to circuit breaker mounting plate 2500. As shown in FIG. 2A, circuit breaker 2400 can be oriented in position 2100 during initial attachment to circuit breaker mounting plate 2500. In position 2100, circuit breaker 2400 can be releasably attached to a bracket 2600. In position 2100, circuit breaker 2400 might not yet be releasably attached to circuit breaker mounting plate 2500 by a clip 2700.

As shown in FIG. 2B, circuit breaker 2400 can be oriented in position 2200 during an intermediate stage of attachment to circuit breaker mounting plate 2500. In position 2200, circuit breaker 2400 can be releasably attached to a bracket 2600. In position 2200, circuit breaker 2400 can cause clip 2700 and/or be indicative that clip 2700 is in a relatively retracted position as compared to that schematically illustrated in FIG. 2A. The relatively retracted position of clip 2700 can allow circuit breaker 2400 to slide into a latchable position with respect to latch 2700.

As shown in FIG. 2C, circuit breaker 2400 can be oriented in position 2300 during an advanced stage of attachment to circuit breaker mounting plate 2500. In position 2300, circuit breaker 2400 can be releasably attached to a bracket 2600. In position 2300, circuit breaker 2400 can be releasably attached to circuit breaker mounting plate 1500 via clip 2700. Clip 2700 can be in a relatively unretracted orientation in position 2300 as compared to that schematically illustrated in FIG. 2B. Thereby, clip 2700 can be adapted to restrain motion of circuit breaker 2400 relative to circuit breaker mounting plate 2500.

Figure 3:
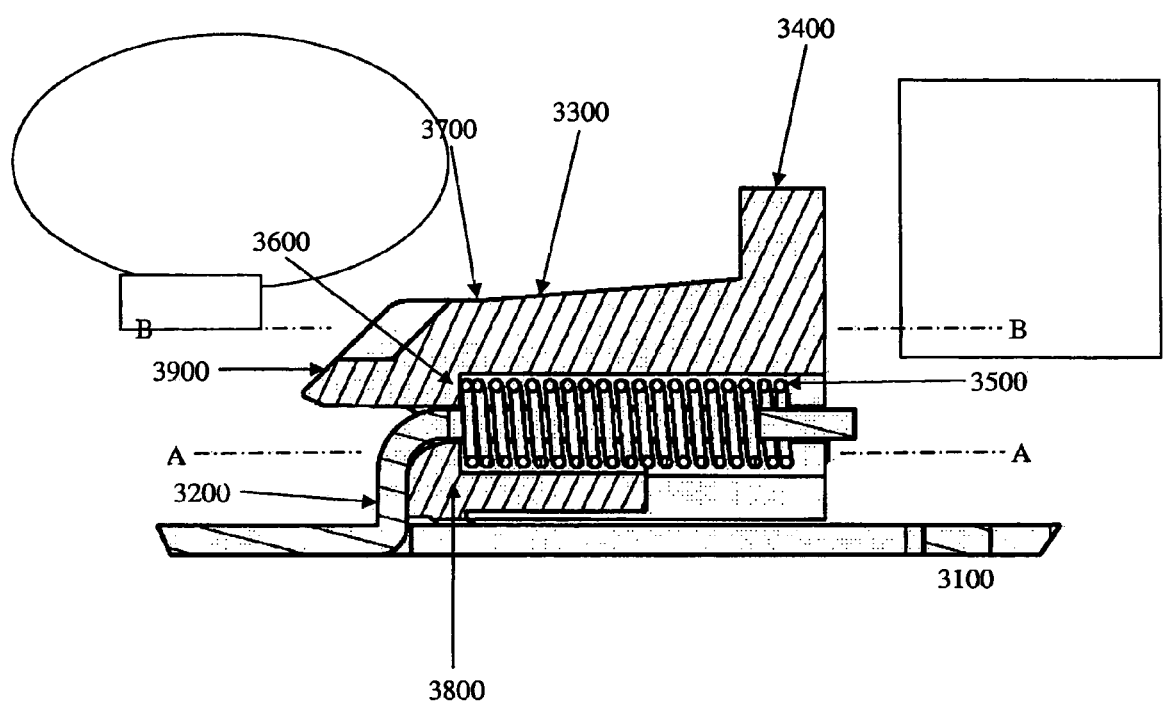
FIG. 3 is a sectional side view of an exemplary embodiment of a system 3000.

FIG. 3 is a sectional side view of a system 3000. System 3000 can comprise a circuit breaker mounting plate 3100. In certain exemplary embodiments, circuit breaker mounting plate 3100 can be supported by and/or comprised in a fixedly and/or releasably attached circuit breaker panel. System 3000 can comprise a prong 3200, which can be integral to and/or releasably and/or fixedly attached to circuit breaker mounting plate 3100. For example, prong 3200 can be attached to circuit breaker mounting plate 3100 via adhesive, one or more weldments, spot welds, screws, rivets, bolts and nuts, and or one or more mechanical clips, etc., and/or can be stamped and/or formed from circuit breaker mounting plate 3100.

Prong 3200 can define a first longitudinal axis A-A that extends in a first direction and in an opposing second direction. One or more surfaces of prong 3200 can be substantially planar and can be adapted, when attached to circuit breaker mounting plate 3100, to be oriented substantially parallel to circuit breaker mounting plate 3100. Prong 3200 can be adapted to slideably receive a clip 3300, which can comprise a latch 3700 and a follower 3800. Prong 3200 and/or follower 3800 can be adapted to restrain motion of clip 3300 relative to circuit breaker mounting plate 3100 in the first direction. Prong 3200 and/or a spring 3500, when mounted to prong 3200, can be adapted to restrain motion of clip 3300 relative to circuit breaker mounting plate 3100 perpendicular to the first longitudinal axis. Prong 3200 and/or spring 3500, when mounted to prong 3200, can be adapted to restrain rotational motion of clip 3300 about the first longitudinal axis of circuit breaker mounting plate 3100. Spring 3500, when mounted to prong 3200, can be adapted to restrain motion of clip 3300 relative to circuit breaker mounting plate 3100 in the second direction.

Spring 3500 can be any of several types of springs such as a helical compression spring, a Belleville spring, a leaf spring, etc. Spring 3500 can be adapted to be slideably coupleable to prong 3200. Once coupled to prong 3200 and clip 3300, spring 3500 can be adapted to move from a first position to a second position responsive to a motive force adapted to translatably, linearly, and/or curvalinearly move clip 3300. A user can provide the motive force to translatably, linearly, and/or curvalinearly move clip 3300 relative to prong 3200. Clip 3300 can be adapted to move and/or compress spring 3500 from a relatively uncompressed first position to a relatively compressed second position. Upon removal of the motive force, spring 3500 can be adapted to return to the relatively uncompressed first position, thereby causing clip 3300 to translatably, linearly, and/or curvalinearly move with spring 3500 to its first position.

Latch 3700 and/or restrainer 3900 can be adapted to restrain a circuit breaker adjacent to circuit breaker mounting plate 3100. Latch 3700 can be adapted to be slideably moved substantially parallel to the first longitudinal axis. Latch 3700 can be adapted, via a lip 3600, to compress spring 3500. Latch 3700 can define a second longitudinal axis B-B that can extend in a third direction and in an opposing fourth direction. Latch 3700 can be adapted to be slideably moved, from a first latch position to a second latch position, responsive to application of a force to clip 3300 and/or latch 3700 via a gripper 3400. System 3000 can be adapted to accept insertion of the circuit breaker with latch 3700 in the second latch position. In certain operative embodiments, system 3000, latch 3700, and/or restrainer 3900 can be adapted to restrain the circuit breaker with latch 3700 in the first latch position. Clip 3300 and/or latch 3700 can be adapted to be coupled to the circuit breaker without a threaded fastener.

Figure 4:
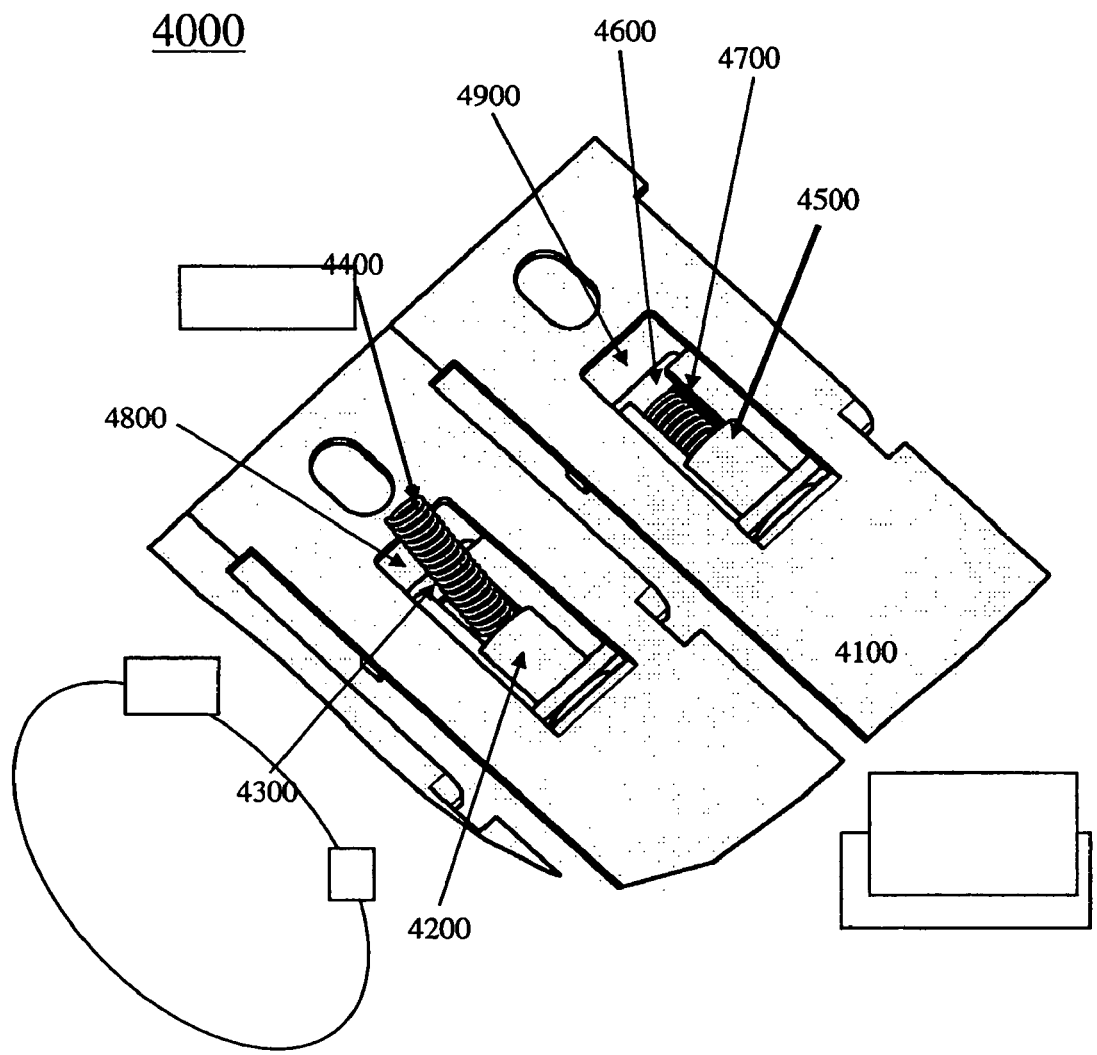
FIG. 4 is an elevation view of an exemplary embodiment of a system 4000.

FIG. 4 is an elevation view of a system 4000, which can comprise a circuit breaker mounting plate 4100. Circuit breaker mounting plate 4100 can comprise and/or be fixedly or releasably attached to a first spring retainer 4200 and a second spring retainer 4300 comprised by a first prong 4800. First spring retainer 4200 and second spring retainer 4300 can be adapted to slideably receive a spring 4400, which is schematically illustrated with spring 4400 in a partially installed position in FIG. 4.

Circuit breaker mounting plate 4100 can comprise and/or be fixedly or releasably attached to a third spring retainer 4500 and a fourth spring retainer 4600 comprised by a second prong 4900. The second prong can be adapted to slideably receive a second spring 4700, which is schematically illustrated in an installed position in FIG. 4. The second prong can define a first longitudinal axis that extends in a first direction and in an opposing second direction. Third spring retainer 4500 and fourth spring retainer 4600 can be adapted to restrain spring 4700, in an operative embodiment, in a direction perpendicular to the first longitudinal axis. Thus, spring 4700 can be adapted to springably mount to the second prong. Spring 4700 can comprise a first end adapted to mount spring 4700 on third spring retainer 4500. Spring 4700 can comprise a second end adapted to mount spring 4700 on second spring retainer 4600. In certain exemplary embodiments, first prong 4800 and second prong 4900 can each be adapted to couple an individual single pole circuit breaker to circuit breaker mounting plate 4100. In certain exemplary embodiments, first prong 4800 and second prong 4900 can be adapted to at least partially couple a circuit breaker comprising a plurality of poles to circuit breaker mounting plate 4100.

Figure 5:
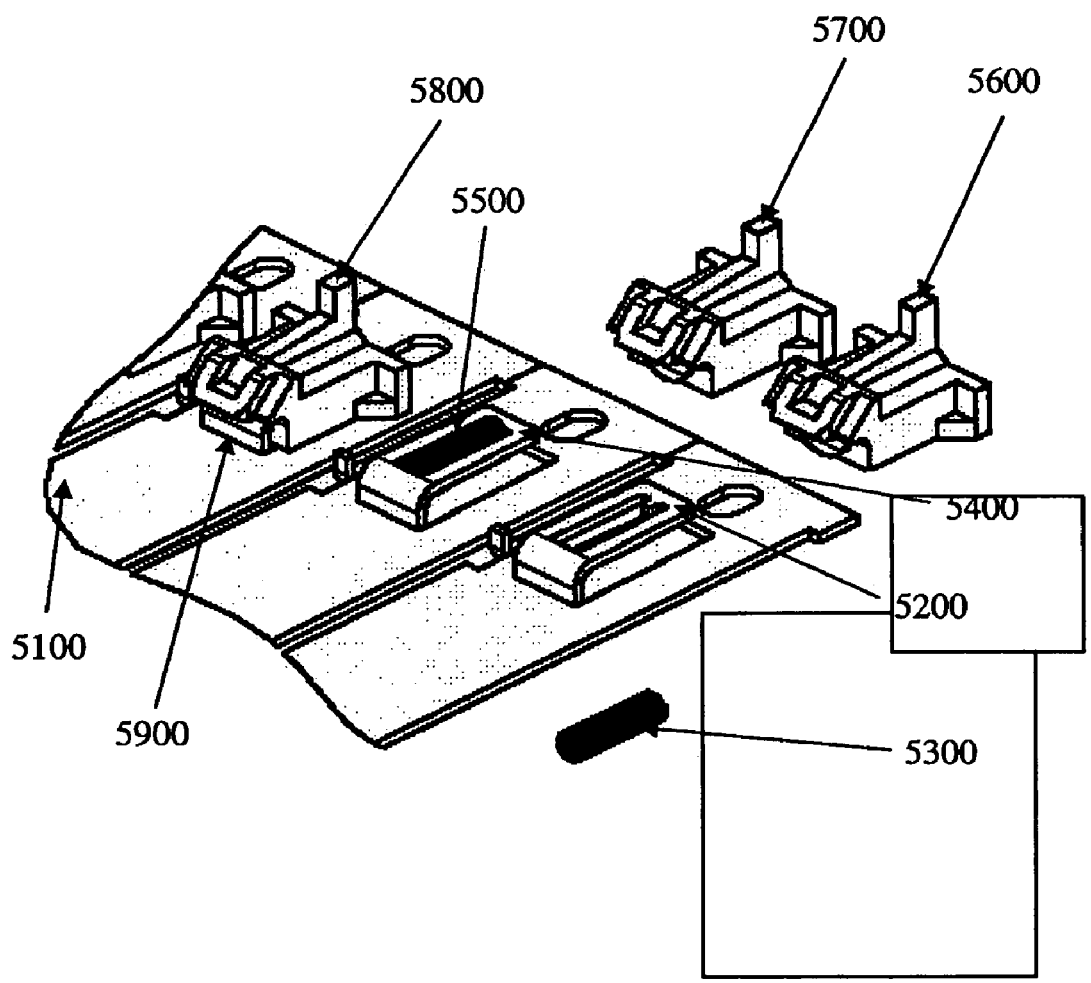
FIG. 5 is a perspective view of an exemplary embodiment of a system 5000.

FIG. 5 is a perspective view of a system 5000, which can comprise a circuit breaker mounting plate 5100. Circuit breaker mounting plate 5100 can comprise, be integral to, and/or be attached to a plurality of prongs, such as prongs 5200, 5400. Prong 5200 is schematically illustrated without a spring 5300 slideably coupled thereto. Prong 5400 is schematically illustrated with a spring 5500 slideably coupled thereto. Once spring 5300 is slideably coupled to prong 5200, prong 5200 can be adapted to slideably receive a clip 5600. Clip 5600 can be slideably, releasably, and/or lockably attached to prong 5200 by one or more retaining clips, weldments, and/or fasteners, etc. Prong 5400 can be adapted to slideably receive clip 5700. Clip 5800 is schematically illustrated as releasably attached to circuit breaker mounting plate 5100 via an underlying and/or corresponding prong 5900. Clip 5800, as installed, can be adapted to releasably attach a circuit breaker (not shown in FIG. 5) adjacent to circuit breaker mounting plate 5100.

Figure 6:
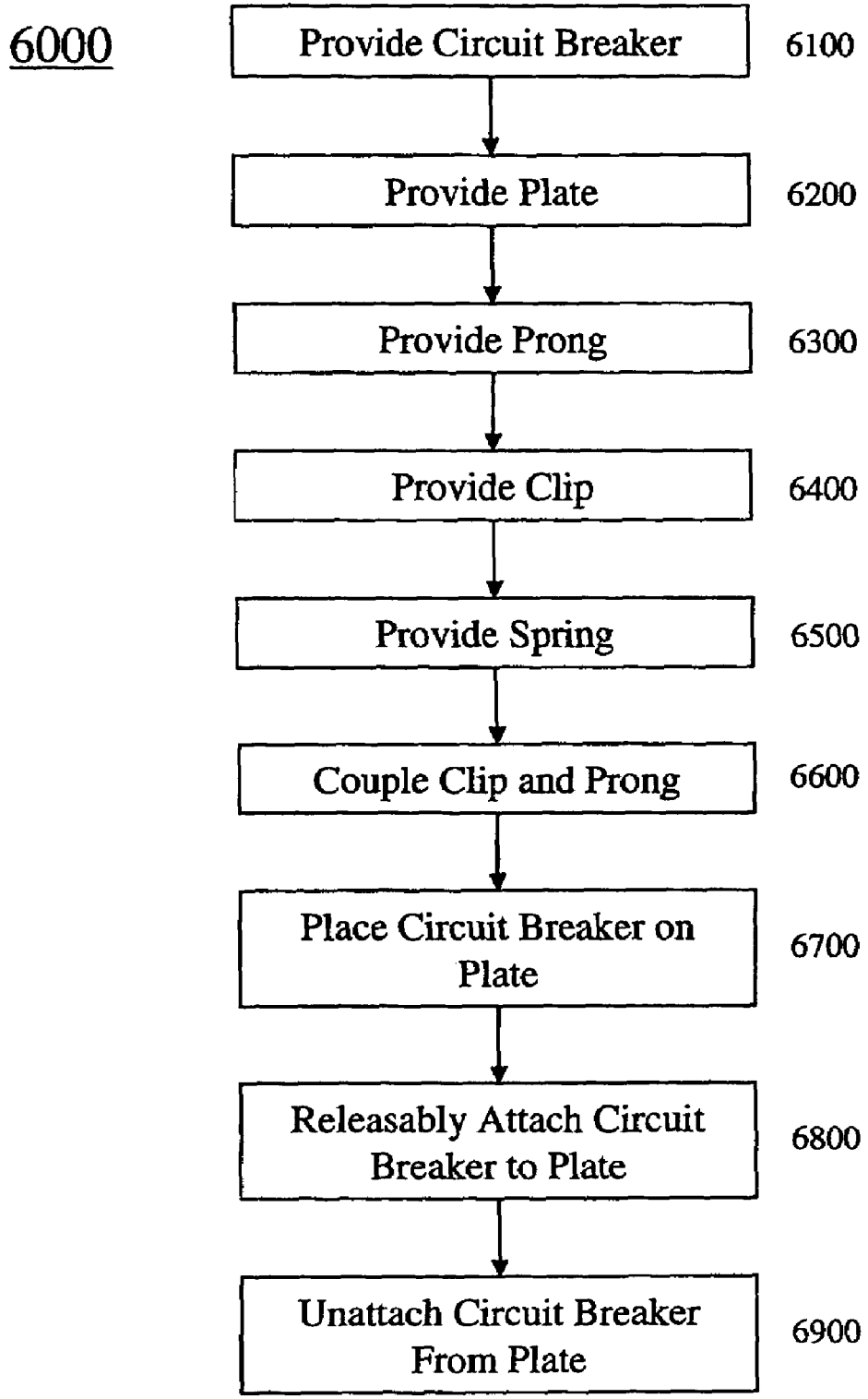
FIG. 6 is a flowchart of an exemplary embodiment of a method 6000.

FIG. 6 is a flowchart of an exemplary embodiment of a method 6000. At activity 6100, a circuit breaker can be provided. The circuit breaker can comprise a physical profile adapted to be releasably attachable to a circuit breaker mounting plate via a bracket and/or a clip.

At activity 6200, the circuit breaker mounting plate can be provided. The circuit breaker mounting plate can be fabricated of an electrically conductive or an electrically non-conductive material.

At activity 6300, a prong can be provided. The prong can define a first longitudinal axis that extends in a first direction and in an opposing second direction. The prong can be adapted to receive a spring, such as a helical or leaf spring. The prong can be adapted to be fixedly or releasably coupled to the circuit breaker mounting plate. The prong can be adapted to receive a spring.

At activity 6400, a clip can be provided. The clip can comprise a latch. The latch can comprise a gripper.

At activity 6500, the spring can be provided. A user can slideably couple the spring to the prong.

At activity 6600, the clip can be slideably coupled to the prong and can be in direct and/or indirect communication with the spring. With the clip coupled to the prong, the latch can be adapted to restrain a circuit breaker on the circuit breaker mounting plate. In certain operative embodiments, the latch can be slideably moved substantially parallel to the first longitudinal axis and adapted to compress the spring responsive to an applied motive force.

At activity 6700, a circuit breaker can be placed adjacent to the circuit breaker mounting plate. A user can position the circuit breaker adjacent to the circuit breaker mounting plate in preparation for releasably attaching the circuit breaker mounting plate.

At activity 6800, the circuit breaker can be releasably attached to the circuit breaker mounting plate. For example, the clip can be transversely moved relative to the prong via an applied force. The circuit breaker can be adapted to slide past the clip with the clip in a retracted position such that a surface of the circuit breaker is substantially adjacent and/or parallel to a surface of the circuit breaker mounting plate. The circuit breaker can be restrained from movement perpendicular to a surface of the circuit breaker mounting plate by a bracket. When the circuit breaker is substantially adjacent and/or parallel to a surface of the circuit breaker mounting plate, the applied force can be removed and the spring can return the clip to a position adapted to restrain the circuit breaker from movement perpendicular to a surface of the circuit breaker mounting plate.

At activity 6900, the circuit breaker can be unattached from the circuit breaker mounting plate. Responsive to a desire of the user to remove the circuit breaker, the user can cause application of a force to the clip to retract and/or compress the spring. Once the clip is retracted, the circuit breaker can be adapted to be rotatably removed from the circuit breaker mounting plate. The circuit breaker can be slideably removed from the bracket. After the circuit breaker has been removed, the force can be removed from the clip to allow the clip, via the spring, to return to an unretracted position.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a U.S. patent, U.S. patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system comprising:
   a circuit breaker mounting plate comprising a prong adapted to slideably receive a clip, said prong defining a first longitudinal axis that extends in a first direction and in an opposing second direction, said prong adapted to receive and directly contact a helical spring; and
   said clip comprising a latch, said latch comprising a gripper, said latch adapted to restrain a circuit breaker directly to said circuit breaker mounting plate via an engagement of a restrainer of said clip with said circuit breaker, said clip not a part of said circuit breaker, said latch adapted to be slideably moved substantially parallel to said first longitudinal axis and adapted to compress said helical spring.

2. The system of claim 1, wherein said latch comprises a lip adapted to compress said helical spring.

3. The system of claim 1, further comprising:
   said helical spring adapted to springably mount to said prong.

4. The system of claim 1, further comprising:
   said helical spring comprising a first end adapted to mount said helical spring on a first helical spring retainer, said helical spring comprising a second end adapted to mount said helical spring on a second helical spring retainer.

5. The system of claim 1, further comprising:
   said circuit breaker.

6. The system of claim 1, wherein said prong comprises a first helical spring retainer and a second helical spring retainer, said first helical spring retainer and said second helical spring retainer adapted to receive a helical spring.

7. The system of claim 1, further comprising:
   a circuit breaker panel adapted to support said circuit breaker mounting plate.

8. The system of claim 1, further comprising:
   a bracket adapted to be mounted on said circuit breaker mounting plate, said bracket adapted to retain the circuit breaker.

9. The system of claim 1, further comprising:
   a bracket adapted to slideably couple to a first side of the circuit breaker, said clip adapted to be coupled to the circuit breaker on a second side of the circuit breaker, the second side substantially opposing the first side.

10. The system of claim 1, wherein said prong is substantially planar and is adapted to be oriented substantially parallel to said circuit breaker mounting plate.

11. The system of claim 1, wherein said latch is slideably moved, from a first latch position to a second latch position, responsive to application of a force to said latch via said gripper.

12. The system of claim 1, wherein said latch is slideably moved, from a first latch position to a second latch position, wherein said system is adapted to accept insertion of the circuit breaker with said latch in said second latch position.

13. The system of claim 1, wherein said latch is slideably moved, from a first latch position to a second latch position, wherein said system is adapted to restrain the circuit breaker with said latch in said first latch position.

14. The system of claim 1, wherein a first helical spring retainer and a second helical spring retainer are adapted to restrain said helical spring in a direction perpendicular to said first longitudinal axis.

15. The system of claim 1, wherein said latch defines a second longitudinal axis tat extends in a third direction and in an opposing fourth direction, said prong adapted to restrain said latch in a direction perpendicular to said second longitudinal axis.

16. The system of claim 1, wherein said prong is adapted to restrain motion of said clip relative to said circuit breaker mounting plate in said first direction.

17. The system of claim 1, wherein said helical spring, when mounted to said prong, is adapted to restrain motion of said clip relative to said circuit breaker mounting plate perpendicular to said first longitudinal axis.

18. The system of claim 1, wherein said helical spring, when mounted to said prong, is adapted to restrain rotational motion of said clip about said first longitudinal axis of said circuit breaker mounting plate.

19. The system of claim 1, wherein said helical spring, when mounted to said prong, is adapted to restrain motion of said clip relative to said circuit breaker mounting plate in said second direction.

20. The system of claim 1, wherein said clip is adapted to be coupled to the circuit breaker without a threaded fastener.

21. A method comprising:
   providing a circuit breaker mounting plate comprising a prong adapted to slideably receive a clip, said prong defining a first longitudinal axis that extends in a first direction and in an opposing second direction, said prong adapted to receive and directly contact a helical spring; and
   providing said clip comprising a latch, said latch comprising a gripper, said latch adapted to restrain a circuit breaker directly to said circuit breaker mounting plate via an engagement of a restrainer of said clip with said circuit breaker, said clip not a part of said circuit breaker, said latch adapted to be slideably moved substantially parallel to said first longitudinal axis and adapted to compress said helical spring.

* * * * *